United States Patent [19]

Kusuda et al.

[11] Patent Number: 4,652,286
[45] Date of Patent: Mar. 24, 1987

[54] EXHAUST GAS FILTER

[75] Inventors: Takao Kusuda, Ashiya; Toshihiro Mihara, Hirakata; Masaaki Yonemura, Nara; Satoshi Kuwano, Kawanishi, all of Japan

[73] Assignee: Matsushita Electric Industrial Co., Ltd., Kadoma, Japan

[21] Appl. No.: 695,423

[22] Filed: Jan. 28, 1985

Related U.S. Application Data

[63] Continuation of Ser. No. 463,667, Feb. 4, 1983, abandoned.

[30] Foreign Application Priority Data

| Feb. 16, 1982 | [JP] | Japan | 57-23839 |
| Jun. 21, 1982 | [JP] | Japan | 57-107209 |
| Jun. 21, 1982 | [JP] | Japan | 57-107210 |
| Jun. 21, 1982 | [JP] | Japan | 57-107211 |
| Jun. 21, 1982 | [JP] | Japan | 57-107212 |

[51] Int. Cl.$^4$ .................. B01D 39/20; C04B 21/06
[52] U.S. Cl. .................. 55/523; 55/498; 55/521; 55/524; 55/DIG. 30; 162/152; 162/181.8
[58] Field of Search .......... 55/488, 497, 498, 500, 55/521, 523, 524, DIG. 30; 210/492, 493.1, 493.3, 510.1; 60/311; 428/116, 118, 186, 192; 162/152, 181.8

[56] References Cited

U.S. PATENT DOCUMENTS

| 3,112,184 | 11/1963 | Hollenbach | 55/521 |
| 3,146,197 | 8/1964 | Getzin | 55/497 |
| 3,358,427 | 12/1967 | Bub | 55/497 |
| 3,458,977 | 8/1969 | Young et al. | 55/497 |
| 3,899,555 | 8/1975 | Takao et al. | 162/152 |
| 4,249,991 | 2/1981 | Baes et al. | 162/152 |
| 4,390,355 | 6/1983 | Hammond, Jr. et al. | 55/523 |
| 4,421,599 | 12/1983 | Kuzuoka et al. | 162/152 |

FOREIGN PATENT DOCUMENTS

| 1213219 | 11/1970 | United Kingdom | 210/492 |
| 1512958 | 6/1978 | United Kingdom | 210/493.3 |
| 1567593 | 5/1980 | United Kingdom | |
| 633969 | 11/1978 | U.S.S.R. | 162/181.8 |

OTHER PUBLICATIONS

Heinrich Ries, Clays Their Occurrence, Properties, and Uses, Third Edt., 1927, pp. 333-339.
Thomas D. Callinan et al, The Manufacture and Properties of Paper Made from Ceramic Products, Naval Research Laboratory, Oct. 20, 1952, pp. 1-7.

Primary Examiner—David L. Lacey
Attorney, Agent, or Firm—Cushman, Darby & Cushman

[57] ABSTRACT

An exhaust gas filter for diesel particulates, comprising a row of a plurality of channels of honeycomb structure of porous sintered ceramic fiber composite sheet, the ceramic fiber composite sheet being produced by a paper-forming method from a slurry of alumino-silicate fiber and fire clay. The honeycomb structure of the ceramic fiber composite sheet is formed by stacking plane sheets and corrugated sheets one atop the other. The filter exhibits low pressure drop yet highly efficient operation by having a bulk density of the ceramic fiber composite sheet in the range of 0.1 g/cm$^3$ to 0.8 g/cm$^3$.

4 Claims, 8 Drawing Figures

EXHAUST GAS FILTER

This is a continuation of Ser. No. 463,667, filed Feb. 4, 1983, now abandoned.

BACKGROUND OF THE INVENTION

1. Field of the Invention

The present invention relates generally to the art of preventing environmental pollution attributable to the exhaust gas of internal combustion engines or the like.

Particularly, the present invention concerns an improvement in an exhaust gas filter for removing particulates such as soot, which is inevitably contained in the exhaust gas of a diesel engine.

2. Description of Prior Art

Particulates such as soot contained in the exhaust gas of diesel engines have recently been reported to be carcinogenic and it is therefore desirable to eliminate such particles from exhaust gases. Although combustors and engines are being improved in order to reduce the emission of such particulates, for the present time it is considered best to trap the particulates with a filter and then burn the particulates trapped on the filter. Various methods have been proposed for eliminating the particulates in exhaust gases.

Conventional proposals include metal mesh or ceramic fibers packed and sealed in a container as a filter element. Porous ceramic foams or extruded ceramic honeycombs are also used. Devices using a metal mesh or packed ceramic fiber randomly filled as the filler element are apt to blow off the fibers, particularly ceramic fibers, during operation resulting in poor filtration. The metal mesh may encounter a problem of melting down during regenerating the filtering function in which the trapped particulates are burnt. The ceramic foam and the extruded ceramic honeycomb often have insufficient thermal shock resistance. The extruded ceramic honeycomb has an insufficient gas permeability which causes a large pressure drop, because it cannot be structured to have a large porosity.

SUMMARY OF THE INVENTION

An object of the present invention is to provide an exhaust gas filter which is composed of a porous ceramic fiber composite.

The exhaust gas filter of the present invention has a high collection efficiency yet causes only a small initial pressure drop and a small increasing rate of the pressure drop.

The present inventors have found that a sintered sheet of ceramic fiber composite made of the ceramic fiber and a binding agent of fire clay is excellent for such a filter element. The present invention provides a new type exhaust gas filter of improved configuration having a corrugated or honeycomb structure made with a sintered sheet of ceramic fiber composite, which can be made of a fire clay and a ceramic fiber such as alumina fiber, alumina-silica fiber or silica-fiber. The exhaust gas filter of the disclosed improved configuration has only a small pressure drop as well as a high collection efficiency of the particulates.

An exhaust gas filter of the present invention generally comprises a row of plural number of channels of honeycomb structure of a sintered ceramic fiber composite sheet composed of alumina-silica fiber and a fire clay. Alternate ends of the channels are closed.

Novel features of the present invention may be better understood by reference ot the following detailed description taken in connection with the accompanying drawings.

DESCRIPTION OF THE PREFERRED EMBODIMENTS

The exhaust gas filter in accordance with the present invention comprises a number of channels of honeycomb structure. The filter is formed by alternately stacking corrugated sheets and plane sheets of sintered ceramic fiber composite which is made of a fire clay and a ceramic fiber such as alumina fiber, alumina-silica fiber or silica fiber. Channels having a generally triangular configuration are formed by one side of the V-shaped corrugated sheet and the flat sheet atop the corrugated sheet. The end openings of the channels are alternately closed. The channels are formed by stacking and bonding the corrugated sheets of the sintered ceramic fiber composite and plane sheets of the sintered ceramic fiber composite in alternate order. The filter and its channels are disposed in a stream of exhaust gas such that the exhaust gas flows into upstream channels having open ends at the inlet side and passes directly through the walls of channels to downstream channels having their open ends at the outlet side. The particulates in the exhaust gas are effectively trapped in the minute pores of walls between upstream channels and downstream channels.

The sintered ceramic fiber composite sheet of the present invention is produced in the following process.

Ceramic fiber of alumina-silica or silica is cut by a chopper into short fibers of predetermined lengths, for instance 0.1–10 mm. The chopped fibers are dispersed in water. Fine particles of silica-alumina clay such as ball clay, or the like and coarse particles, such as petalite or spodumene, are then added to the fiber dispersion in an amount of from 4 wt% to 60 wt% of the total weight to give a slurry, and the slurry is well stirred. Vinyl acetate emulsion or acrylic emulsion as an organic binder, and an organic fiber such as pulp or rayon fibers are added to the slurry. Next, a starch solution is added to this slurry and the slurry is placed in a forming die and vacuum drained to form a sheet. After drying, the sheet is fired at about 600° C. to burn out the organic substances, and then sintered at a temperature above 900° C. in air to yield a sintered ceramic fiber composite sheet. A preferable range of the contents of the heat resistant ceramic fiber is from 40 wt% to 96 wt%. The porosity of the sintered ceramic fiber composite sheet is desired to be at least 70%. Mean diameter of the heat resistant ceramic fibers are preferably 1–20 μm in order to produce a filter element having both a low pressure drop and a high particulates collection efficiency. In general, when the filtering surface area of the filter increases, the pressure drop and increasing rate of the pressure drop decrease. Accordingly, several constructions of the filter were tested having a filtering surface area as large as possible using the following procedure.

Figure 1:
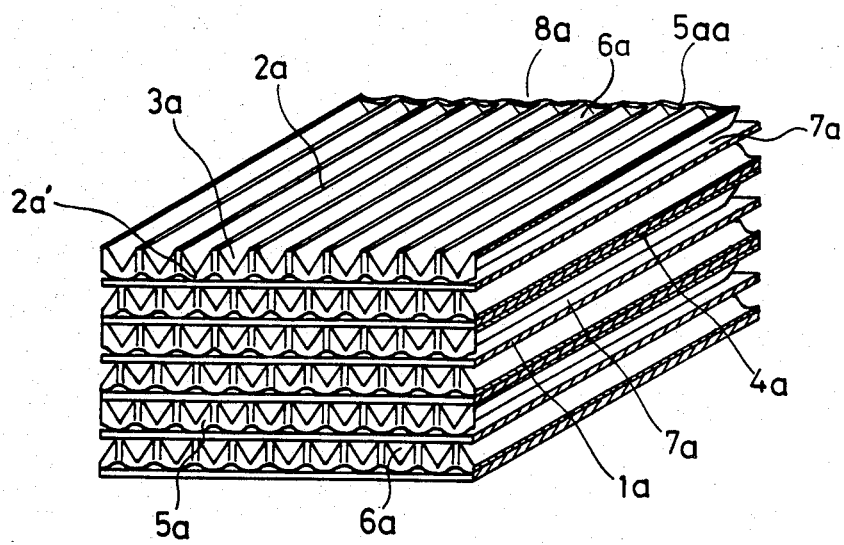
FIG. 1 is a general perspective view of an example of an exhaust gas filter embodying the present invention.
Figure 2:
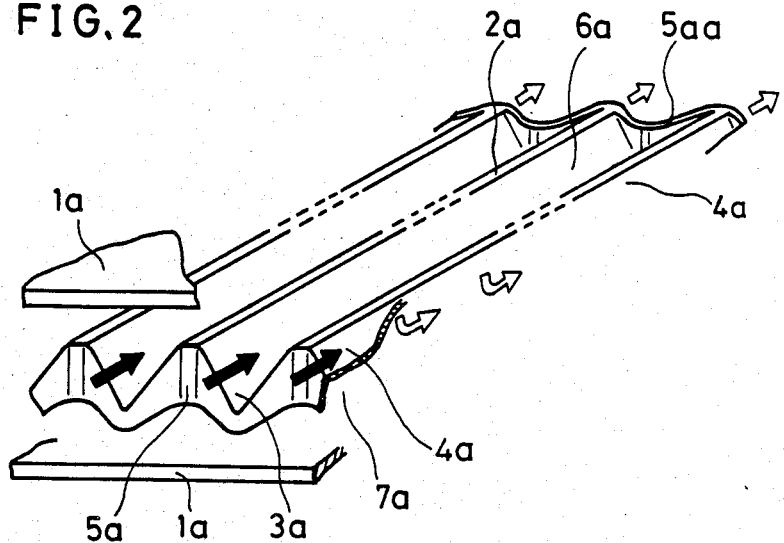
FIG. 2 is a partially enlarged view showing detail of the closed ends of the embodiments shown in FIG. 1, with the plane sheets 1a separated from the corrugated sheet 4a for purposes of illustration.

As shown in FIG. 1, a honeycomb structure 8a is made by stacking and bonding plane sheets 1a and corrugated sheets 4a alternately in layers. The corrugated sheet and the plane sheet are bonded together at the top portion of the corrugated sheet 2a. As shown in FIG. 2, the front edge and the back edge of the corrugated sheet are pressed downwards and pressed upwards, respectively, to form closed ends 5a and 5aa of channels 6a and 7a. FIG. 2 shows a detailed configuration and the gas flows in relation to channels 6a and 7a. In FIG. 2, the black arrows show flows of inflowing exhaust gas requiring filtration and the white arrows show flows of outgoing, filtered gas.

Figure 3:
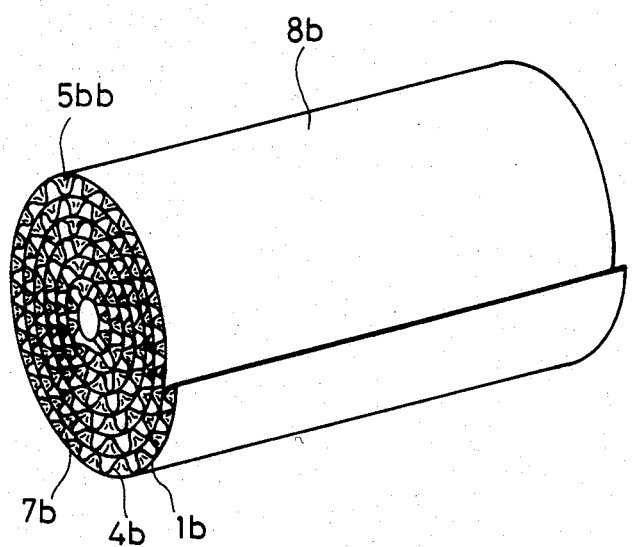
FIG. 3 is a general perspective view of another embodiment of an exhaust gas filter embodying the present invention.
Figure 4:
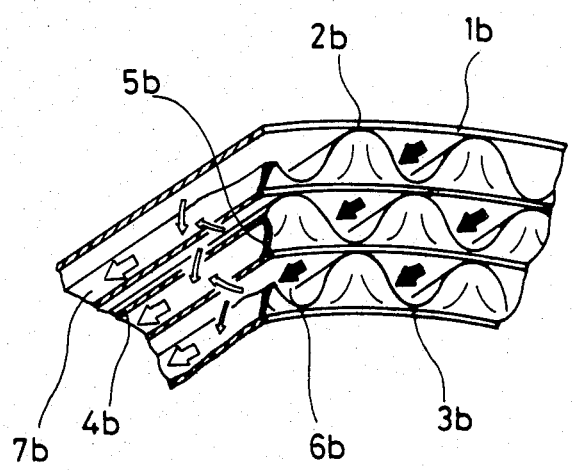
FIG. 4 is a partially enlarged view showing a detail of the front part of the embodiment of FIG. 3.

FIG. 3 and FIG. 4 show another example, wherein a curved plane sheet 1b and a correspondingly curved corrugated sheet 4b are bound at their point of contact 2b and rolled together to form a round structure. Also in this example, the front edge and the back edge of the corrugated sheet are pressed downwards and pressed upwards to form closed ends 5b and 5bb of the channels 6b and 7b, respectively. In FIG. 4, the black arrows show flows of inflowing exhaust gas and the white arrows show flows of outgoing gas.

Figure 5:
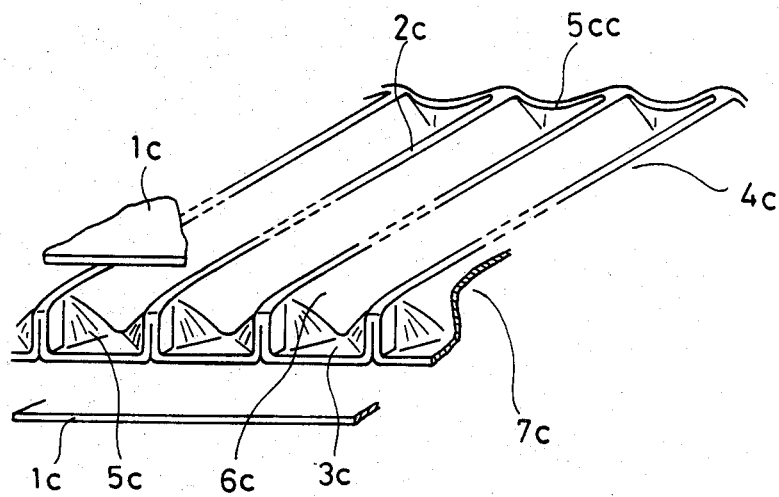
FIG. 5 is a perspective view of detail of the closed ends of another embodiment.

FIG. 5 shows another modification, which is applicable both for the configurations shown in FIG. 1 and FIG. 3. In this example, the closed ends 5c form wider open ends 3c of U-shaped channels in order to decrease the pressure drop at upstream channels 6c. Open and closed ends of the honeycomb structure may be protected by dipping them in the fire clay slurry and firing, so that the ends are hardened to prevent attrition that may be caused by the exhaust gas flow.

The sintered ceramic fiber composite sheet of the present invention has a low pressure drop that is a pressure drop of less than 10 cm Aq using a wall thickness of 1 mm measured at room temperature and with a gas flow velocity of 10 cm/sec. The sintered ceramic fiber composite sheet can withstand thermal shock cycle tests of more than 1000 times with a 850° C. temperature difference.

Since the sintered ceramic fiber composite sheets have a large porosity, the filtration of the particulates is performed not only at the surface but also inside of the sheet, thus the honeycomb structured filter of the present invention shows a low increasing rate of pressure drop.

Furthermore, the exhaust gas filter of the present invention can be produced so as to be adjustable in its pressure drop, increasing rate of pressure drop and collection efficiency of particulates. This is accomplished by varying the diameter of the ceramic fibers of the composite, the sizes of the coarse particles and/or bulk density.

EXAMPLE 1

560 g of ceramic fibers of alumina silica having a mean diameter $\phi$ of 2 μm were cut into lengths of 0.1–10 mm. The fiber was then dispersed into about 50 liters of water. A small quantity of surface active agent was added thereto. Next, fire clay (120 g) was prepared by blending equal amounts of ball clay and china clay and 70 g of petalite. The fire clay was added to the ceramic fiber dispersion and moderately stirred and blended to give an intimate admixture. An aqueous solution of starch was added into the admixture of the ceramic fiber and the fire clay. Vinyl acetate emulsion (40 g) was also added thereto at the same time. Then, the admixture was poured into 500 liters of water and diluted to give a slurry. The slurry was put into a papermaking machine provided with 60 mesh filter screen, and sheets were formed of 2 m$^2$ and 1 mm in thickness. The sheet was then dried at 150° C. in air for about 30 minutes to form a ceramic fiber composite sheet.

The ceramic fiber composite sheet was cut into pieces 120 mm wide and 240 mm long. Corrugated sheets having 4 mm pitch and 3 mm peak-to-peak heights were prepared. Thirty pairs of plane sheets and corrugated sheets were alternately stacked as shown in FIG. 1 and FIG. 2. Front ends and back ends of the corrugated sheet 4a were pressed downwards and pressed upwards, respectively, to form closed ends 5a and 5aa of the channels 6a and 7a. The honeycomb structure 8a was fired at 1200° C. for one hour. The sintered honeycomb structure of ceramic fiber composite prepared in the above-mentioned process was mounted in a known tubular container with known appropriate shock absorber and packing to complete an exhaust gas filter. The resulting structure was as depicted in FIGS. 1 and 2.

Figure 6:
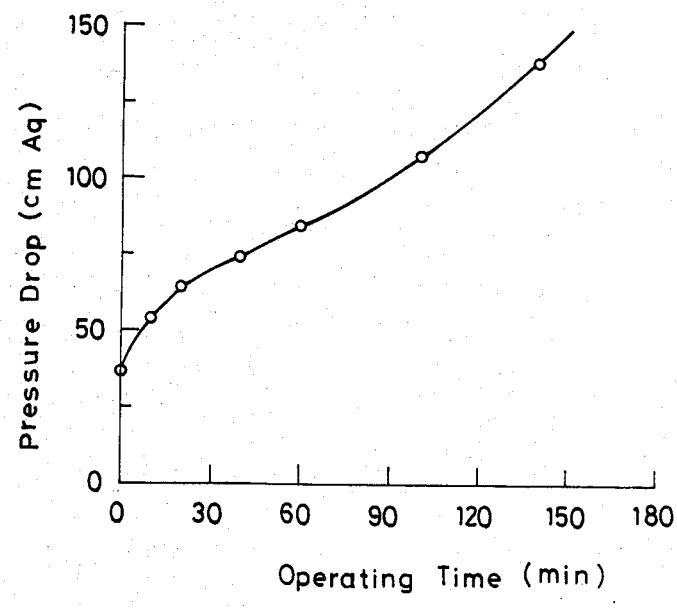
FIG. 6 is a graph depicting the increase of pressure drop over a period of operating time of the filter of the present invention.

FIG. 6 shows the relationship between the pressure drop of the filter compared with the operating time of a diesel engine, which emitted exhaust gas containing about 0.1 g/m$^3$ particulates, at a rate of 3.3 m$^3$/min. The collection efficiency of particulates was 80%.

EXAMPLE 2

Using the same process as Example 1, a ceramic fiber composite sheet of a similar peak-to-peak and pitch configuration, having a 2 m$^2$ area and 1 mm thickness was prepared. Plane sheets and corrugated sheets were stacked in a round shape as shown in FIG. 3 and FIG. 4. Front and back ends of the corrugated sheet 4b were pressed downwards and pressed upwards, respectively, to form closed ends 5b and 5bb of the channels 6b and 7b. The two sheets were then rolled on each other so that the contact points 2b contacted the adjacent plane sheet 1b forming a rolled structure. Thus, a filter element with a round shape of a honeycomb structure was prepared as shown in FIG. 3 and FIG. 4, having upstream channels 6b and downstream channels 7b with closed ends 5b and 5bb. The round-shaped honeycomb structure of the ceramic fiber composite sheet was then fired at 1200° C. for one hour. The sintered honeycomb structure was then mounted in a known tubular container with known appropriate shock absorber and packing to complete an exhaust gas filter.

The filter of the round-shaped honeycomb structure was easy to make and showed superior thermal shock resistivity with pressure drop characteristics substantially the same as that of Example 1.

EXAMPLE 3

A plane sheet 1c and a corrugated sheet 4c with closed ends 5c, 5cc were prepared in the same manner as that of Example 1. The ends of the corrugated sheets were pressed in a manner such that the closed ends 5c were formed having a wide space 3c as shown in FIG. 5. The plane sheets 1c and corrugated sheets 4c were alternatively stacked one upon the other in layers, bonded and fired for about one hour at 1200° C. to form a sintered ceramic fiber composite filter element.

The sintered filter element was mounted in a known tubular container with known shock absorber and appropriate packing to complete an exhaust gas filter. The exhaust gas filter was connected to the exhaust gas outlet of a diesel engine. The filter was tested under the same conditions as that of Example 1. The initial pressure drop was less than 10 cm Aq, a value satisfactory for such a filter.

EXAMPLE 4

Ceramic fibers of alumina-silica were cut into lengths of 0.1 mm to 10 mm. The fiber was measured into separate lots of 17, 20, 29, 39, 44, 47 and 48 weight parts. Each lot of measured ceramic fiber was dispersed into 3000 weight parts of water together with rayon fiber, pulp and a small amount of a surface active agent. Concurrently lots of ball clay of 19, 17, 12, 6, 3, 1 and 0.9 weight parts were measured, and mixed with lots of coarse grained petalite (100 μm in diameter) of 13, 12, 8, 4, 2, 1 and 0.6 weight parts, respectively. Each of the mixtures was suspended in 500 weight parts of water to prepare seven suspensions. Next, the above ceramic fiber dispersions and the fire clay suspensions were mixed under stirring. Six weight parts of vinyl acetate emulsion was added to each mixture as were appropriate quantities of a starch solution.

The admixtures were diluted by pouring into 30,000 weight parts of water to give seven slurries, which were then formed into sheets of 1 mm thickness by using a belt-type paper-forming machine. The resultant sheets were fired at 600° C. in air in an electric furnace for one hour to burn out the organic material contained in the sheet materials. Thereafter, the sheets were fired at 1250° C. in air for 1.5 hours to make sintered ceramic fiber composite sheets. Bending strengths of the resultant seven samples of sintered ceramic fiber composite sheets are shown in Table 1.

TABLE 1
(Bending strength of ceramic composite sheets)

| Sample No. | Contents of Ceramic Fiber Weight parts | Contents of Ceramic Fiber Weight % | Bending Strength [Kg/cm$^2$] |
|---|---|---|---|
| 1 | 17 | 35 | 45 |
| 2 | 20 | 41 | 41 |
| 3 | 29 | 59 | 24 |
| 4 | 39 | 80 | 10 |
| 5 | 44 | 90 | 7 |
| 6 | 47 | 96 | 2 |
| 7 | 48 | 97 | 0.7 |

The resultant sheet was prepared into corrugated sheets in the same manner as elucidated in Example 2 to form corrugations of 4 mm in pitch and 3 mm peak-to-peak height; a plane sheet was bonded to the corrugated sheet to form a composite sheet like a corrugated cardboard. The composite sheet is rolled while bonding as shown in FIG. 4, and the resultant rolled honeycomb structure had a whirlpool-shaped cross-section. Then the rolled honeycomb structure was fired in an electric furnace at about 600° C. for one hour in an air atmosphere, to burn out organic components in the sheet material. Thereafter, the roll was sintered in an air atmosphere at about 1250° C. for 1.5 hours. A composite filter element was thus obtained.

As shown in Table 1, the bending strength of the ceramic composite sheet decreases as the content of ceramic fiber component increases. When the content of ceramic fiber component exceeds 96 wt%, the bending strength falls below 2 kg/cm$^2$, and the sheet is not suitable for construction of a honeycomb structure. On the other hand, when the content of the ceramic fiber is less than 40 wt%, the pressure drop of the filter composed of the ceramic fiber composite sheet is high and not desirable. Thus while filter element No. 3 of Table 1 with 59 wt% of ceramic fiber has an initial pressure drop of 25 cm Aq, filter element No. 1 with 35 wt% ceramic fiber has an initial pressure drop of 41.5 cm Aq which performs only as a cake filtration device.

EXAMPLE 5

29 weight parts alumina-silica ceramic fiber having a mean diameter $\bar{\phi}$ of 3 μm was measured and cut into yarns of 0.1 to 10 mm lengths. The fiber was dispersed into 3000 weight parts of water to which rayon fiber, pulp and a small amount of surface active agent were added. Concurrently, 12 weight parts of ball clay containing sericite clay was measured and suspended in 500 weight parts of water, and then 4 weight parts of petalite about 100 μm in diameter were mixed into the suspension. The ceramic fiber dispersion and the clay suspension were then blended with stirring. A starch solution was added to the suspension. Acrylic emulsion and polyvinyl alcohol were added to the mixture, and the mixture was poured into 30,000 weight parts of water to produce a slurry. Then the slurry was put into a belt-type paper-forming machine provided with a 60 mesh filter screen and a belt-type sheet 1 mm in thickness was produced. The sheet was then dried at 150° C. in air for 30 minutes to form a ceramic fiber composite sheet.

In a manner similar to Example 2 and Example 4, a round honeycomb structure was formed and sintered to make a filter element. Large diameter petalite included in the slurry reduced the time required for drying and dehydration. The filter element was mounted in a known tubular container with known shock absorber and appropriate packing to complete an exhaust gas filter. Table 2 shows the initial pressure drop and increased value of pressure drop after running for 20 minutes when the exhaust gas filter was connected to the exhaust pipe of a diesel engine emitting exhaust gas containing about 0.1 g/m$^3$ particulates at a rate of 3.3 m$^3$/min. The data obtained from a reference filter element which does not contain the petalite powder is also shown for comparison.

TABLE 2
(Characteristics of filter elements)

| | Filter element of Example 5 | Filter element (for comparison) |
|---|---|---|
| Initial pressure drop [cm Aq] | 15 | 31 |
| Increased value of pressure drop [cm Aq] | 26 | 66 |
| Particulate | 94 | 97 |

TABLE 2-continued (Characteristics of filter elements)

|  | Filter element of Example 5 | Filter element (for comparison) |
|---|---|---|
| collection efficiency [%] | | |

As can be observed in Table 2, a smaller initial pressure drop and a smaller increasing rate of pressure drop are observed in the filter of this example.

When a section of the filter element after use in the above-mentioned running test was examined by means of scanning electron microscopy, the particulates were found to be diffused to a depth of 200 μm, indicating that clarification filtration which is to trap particulates on the inside of the filter walls was effectively achieved in the case of the filter element of the present invention. It is presumed that by means of this clarification filtration the increase of pressure drop was reduced in the embodiment of the present invention. Applicants believe that as a result of mixing large diameter coarse particles, pores between the fibers were widened, thereby permitting deep intrusions of particulates into the sheet, and is believed to be the reason for the decrease in the initial pressure drop and the increasing rate of pressure drop.

EXAMPLE 6

Ceramic fibers of alumina-silica of mean diameter $\bar{\phi}$ of about 1 μm, 3 μm, 6 μm, 10 μm and 20 μm were respectively measured into lots of 29 weight parts and cut by a chopper into lengths of 0.1 to 10 mm. The five samples of chopped fibers were mixed with pulp and a small amount of surface active agent and dispersed in 3000 weight parts of water to give five dispersions. Concurrently, 35 weight parts of china clay with selicite and talc mixed therein were dispersed into 2500 weight parts of water to give a suspension. This clay suspension was then divided into five equal portions. The five dispersions of ceramic fibers and the equally divided clay suspensions were mixed together with stirring. Each mixture was further divided into five mixtures, but the volume ratio of the divided mixture was 1:2:4:6:8 thereby producing 25 samples in total. Methyl-cellulose solution and starch solution were added to each of the 25 samples to agglutimate the fiber and clay. After adding vinyl acetate emulsion and polyvinyl alcohol, the 25 samples were diluted respectively by 30,000 weight parts of water. The 25 solutions were then placed in a paper-forming machine and formed into sheets using the conventional method, thereby yielding 25 types of sheets of different thicknesses.

The resulting sheet was pressed under heating with water vapor at about 150° C. to 200° C. to give sheets of 2 mm in thickness. Thereafter, by forming and sintering in the same way as that of Example 2, the filter element as depicted in FIG. 4 was completed.

Samples were cut off from the above-mentioned sheet, and sintered in plane sheets to give sintered ceramic fiber composite sheets. The bulk density of the sintered ceramic fiber composite sheet was measured. Pressure drop and particulates collection efficiency of the filter of this example was also measured and the results shown in FIG. 7 and FIG. 8.

The bulk density of the resultant sintered ceramic fiber composite sheets were 0.1 to 0.8 g/cm$^3$; this value corresponds to greater than 70% porosity.

Figure 7:
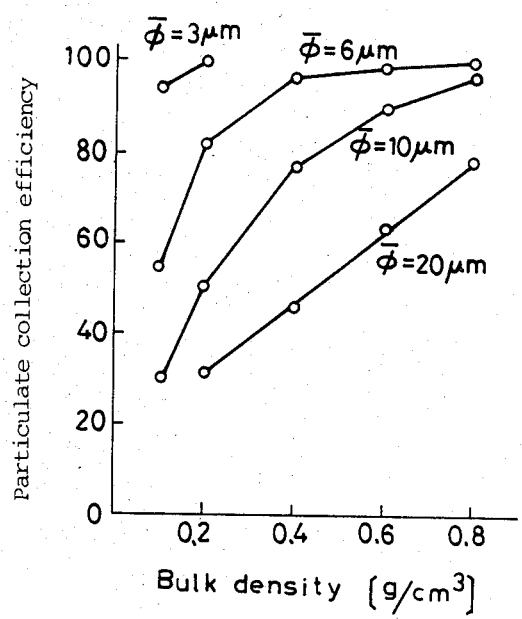
FIG. 7 is a graph comparing the bulk density with the particulate collection efficiency of the filter of the present invention.
Figure 8:
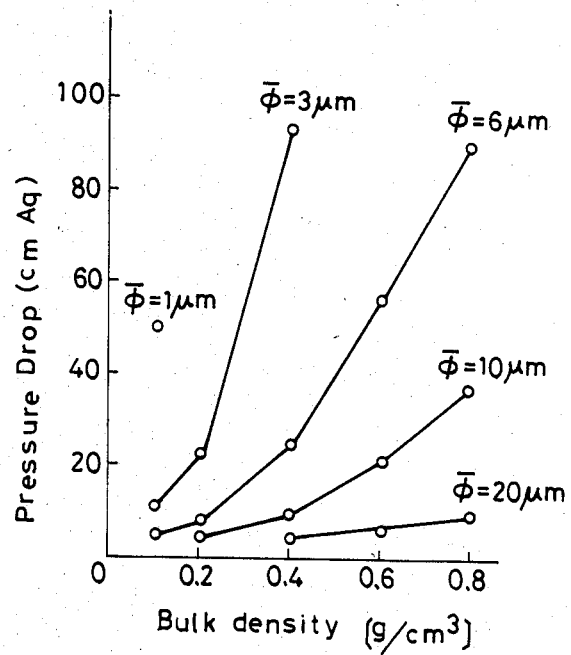
FIG. 8 is a graph comparing the bulk density with the pressure drop of the filter of the present invention.

Accordingly, a lower pressure drop of the filter constructed with ceramic fiber composite sheet at a specified collection efficiency can be designed by selecting the proper values for the bulk density of the sheet and the diameter of the fiber used. The bulk density can be selected in the range from 0.1 to 0.8 g/cm$^3$, as shown in FIG. 7.

What is claimed is:

1. An exhaust gas filter for removing diesel particulates comprising a honeycomb of porous sintered ceramic fiber composite sheets, said honeycomb having a plurality of channels with alternate ends of said channels closed, said ceramic fiber composite sheets having a bulk density of from 0.1 to 0.8 g/cm$^3$ and consisting of from 40 wt. % to 96 wt. % ceramic fiber having a mean diameter of from 1 to 20/μm together with and from 60 wt. % to 4 wt. % of a fire clay binder.

2. An exhaust gas filter for removing particulates entrained in the exhaust gas from a diesel engine, said filter comprising a stack of plane porous sintered ceramic fiber sheets and corrugated porous sintered ceramic fiber sheets arranged in alternating fashion and stacked one atop the other, the stack defining a plurality of exhaust gas conducting channels between the corrugated and plane sheets which are provided with closing members at alternating ends such that incoming exhaust gas passes into the ends of the open channels to it, is transmitted through the pores of the ceramic sheets and exits through the adjacent open outlet channel, each of the ceramic sheets having a bulk density of from 0.1 to 0.8 g/cm$^3$ and consisting of from 40 wt. % to 96 wt. % of ceramic fiber having a mean diameter of from 1 to 10 μm together with from 60 wt. % to 4 wt. % of a fire clay binder.

3. The exhaust gas filter according to claim 2 wherein the filter is in the form of a rolled cylinder.

4. An exhaust gas filter for removing diesel particulates comprising a honeycomb of porous sintered ceramic fiber composite sheets, said honeycomb having a plurality of channels with alternate ends of said channels closed, said ceramic fiber composite sheets having a bulk density in the range of from 0.1 g/cm$^3$ to 0.8 g/cm$^3$ and consisting of from 40 wt% to 96 wt% alumina-silica ceramic fiber together with and from 60 wt% to 4 wt% of fire clay binder.

* * * * *